United States Patent [19]
Smith

[11] Patent Number: 6,018,293
[45] Date of Patent: Jan. 25, 2000

[54] METHODS AND APPARATUS FOR PROVIDING SECURITIES AND STOCK QUOTATIONS TO AN OCCUPANT OF A VEHICLE

[75] Inventor: Harry F. Smith, Newtown, Conn.

[73] Assignee: Intellectual Property Development Associates of Connecticut, Inc., Trumbull, Conn.

[21] Appl. No.: 09/258,983

[22] Filed: Feb. 26, 1999

Related U.S. Application Data

[63] Continuation of application No. 09/020,642, Feb. 9, 1998, which is a continuation of application No. 08/370,169, Jan. 9, 1995, Pat. No. 5,717,374, which is a continuation of application No. 08/177,859, Jan. 6, 1994, Pat. No. 5,422,624, which is a continuation-in-part of application No. 08/066,967, May 23, 1993, Pat. No. 5,327,066.

[51] Int. Cl.$^7$ ...................................................... B60Q 1/00
[52] U.S. Cl. ........................... 340/438; 340/439; 324/434; 320/2; 320/21
[58] Field of Search ................... 340/438, 439; 320/2, 21, 17, 18, 31; 324/434

[56] References Cited

U.S. PATENT DOCUMENTS

| | | | |
|---|---|---|---|
| 4,177,466 | 12/1979 | Reagan | 343/112 TC |
| 4,263,945 | 4/1981 | Van Ness | 141/98 |
| 4,309,644 | 1/1982 | Reimers et al. | 318/139 |
| 4,347,472 | 8/1982 | Lemelson | 320/2 |
| 4,383,210 | 5/1983 | Wilkinson | 320/2 |
| 4,404,641 | 9/1983 | Bazarnik | 364/569 |
| 4,528,643 | 7/1985 | Freeny, Jr. | 364/900 |
| 4,532,418 | 7/1985 | Meese et al. | 235/381 |
| 4,532,511 | 7/1985 | Lemelson | 340/933 |
| 4,800,328 | 1/1989 | Bolger et al. | 320/2 |
| 4,804,937 | 2/1989 | Barbiaux et al. | 340/52 F |
| 4,861,971 | 8/1989 | Chan | 235/381 |
| 4,876,540 | 10/1989 | Berthon et al. | 340/932.2 |
| 4,880,097 | 11/1989 | Speas | 194/239 |
| 4,934,419 | 6/1990 | Lamont et al. | 364/465 |
| 4,967,895 | 11/1990 | Speas | 194/200 |
| 5,003,476 | 3/1991 | Abe | 364/424.03 |
| 5,003,520 | 3/1991 | Geieu et al. | 368/90 |
| 5,049,802 | 9/1991 | Mintus et al. | 320/2 |
| 5,053,774 | 10/1991 | Schuermann et al. | 342/44 |
| 5,058,044 | 10/1991 | Stewart et al. | 364/551.01 |
| 5,072,380 | 12/1991 | Randelman et al. | 364/406 |
| 5,157,319 | 10/1992 | Klontz et al. | 320/2 |
| 5,202,617 | 4/1993 | Nor | 320/2 |
| 5,204,819 | 4/1993 | Ryan | 364/465 |
| 5,351,052 | 9/1994 | D'Hont et al. | 342/42 |
| 5,359,522 | 10/1994 | Ryan | 364/465 |
| 5,400,018 | 3/1995 | Scholl et al. | 340/825 |
| 5,422,624 | 6/1995 | Smith | 340/438 |
| 5,442,553 | 8/1995 | Parrillo | 364/424 |
| 5,451,755 | 9/1995 | Duval et al. | 235/381 |
| 5,534,856 | 7/1996 | Cadman | 340/325.34 |
| 5,557,268 | 9/1996 | Hughes et al. | 340/933 |
| 5,717,374 | 2/1998 | Smith | 340/438 |

Primary Examiner—Daryl Pope

[57] ABSTRACT

Methods and apparatus are disclosed for inputting messages and other information, such as advertisements, to a vehicle while the vehicle is coupled to a local station, such as a recharging station or a refueling station. The messages can be selected in accordance with information received from the vehicle, including information that selectively identifies one, some, or all of: (a) a characteristic of an occupant of the vehicle (e.g., name, account number, address, etc.); (b) a characteristic of the vehicle (e.g., make, model, year, class, registration number, marker number, odometer reading, owner, etc.); (c) a destination of the vehicle (entered through a data entry console and optionally stored within a vehicle memory); and (d) any other characteristic of interest.

41 Claims, 8 Drawing Sheets

METHODS AND APPARATUS FOR PROVIDING SECURITIES AND STOCK QUOTATIONS TO AN OCCUPANT OF A VEHICLE

CROSS-REFERENCE TO A RELATED PATENT APPLICATION

This patent application is a continuation of copending and allowed U.S. patent application Ser. No. 09/020,642, filed Feb. 9, 1998; which is a continuation of U.S. patent application Ser. No. 08/370,169, filed Jan. 9, 1995, now U.S. Pat. No. : 5,717,374, issued on Feb. 10, 1998; which is a continuation of U.S. patent application Ser. No. 08/177,859, filed Jan. 6, 1994, now U.S. Pat. No. 5,422,624, issued on Jun. 6, 1995; which is a continuation-in-part of patent application Ser. No. 08/066,967, filed May 23, 1993, now U.S. Pat. No. 5,327,066, issued on Jul. 5, 1994.

FIELD OF THE INVENTION

This invention relates generally to methods and apparatus for dispensing a consumable energy source to a vehicle.

BACKGROUND OF THE INVENTION

Advances in battery technology are expected to provide reliable power sources for electrically operated passenger vehicles. One requirement for such vehicles is the provision of battery recharging apparatus. The recharging of a vehicle's battery when parked at the owner's home may be achieved in a relatively straight forward manner. However, the widespread use of battery powered vehicles necessitates that recharging also be accomplished at other locations. By example, it may often be required to recharge a vehicle's battery while parked at a remote location, such as an office building, factory, hotel, shopping center, airport, or train station. To accomplish recharging of the vehicle's battery at a remote location there must also be provided a reliable and accurate method of accounting for the power consumed in recharging the battery.

In addition, it can be useful to provide a mechanism to enable an information flow between an occupant of the vehicle and an external source or recipient of information, whether the vehicle be battery powered or powered by a conventional internal combustion engine. For example, it would be beneficial to enable information representing personal messages, advertisements (solicited or unsolicited), road and weather conditions, etc., to be entered into the vehicle for display to an occupant of the vehicle.

The following U.S. patents disclose various types of battery charging systems: U.S. Pat. No. 5,202,617, issued on Apr. 13, 1993, entitled "Charging Station For Electric Vehicles" by Nor; U.S. Pat. No. 5,049,802, issued on Sep. 17, 1991, entitled "Charging System For A Vehicle" by Mintus et al.; U.S. Pat. No. 4,532,418, issued on Jul. 30, 1985, entitled "Microprocessor Electric Vehicle Charging and Parking Meter System Structure And Method" by Meese et al.; U.S. Pat. No. 4,383,210, issued on May 10, 1983, entitled "Apparatus And Method For Recharging An Energy Storage Device" by Wilkinson; U.S. Pat. No. 4,347,472, issued on Aug. 31, 1982, entitled "Apparatus And Method For Charging A Battery In A Vehicle" by Lemelson; and U.S. Pat. No. 4,309,644, issued on Jan. 5, 1982, entitled "Electric Vehicle Controller Adapted For Charge Station Connection" by Reimers et al.

The following two U.S. patents disclose systems for charging a battery within a vehicle without physically contacting the vehicle: U.S. Pat. No. 5,157,319, issued on Oct. 20, 1992, entitled "Contactless Battery Charging System" by Klontz et al.; and U.S. Pat. No. 4,800,328, issued on Jan. 24, 1989, entitled "Inductive Power Coupling With Constant Voltage Output" by Bolger et al.

The following U.S. patents disclose various systems for accounting for parking fees: U.S. Pat. No. 5,003,520, issued Mar. 26, 1991, entitled "Time Accounting System In Particular For Parking Subject To Charge" by Grieu et al.; U.S. Pat. No. 4,880,097, issued Nov. 14, 1989, entitled "Park Card System For Electronic Parking Meter" by Speas; U.S. Pat. No. 4,876,540, issued on Oct. 24, 1989, entitled "System For Controlling Metered Parking" by Berthon et al.; U.S. Pat. No. 4,861,971, issued on Aug. 29, 1989 entitled "Parking Meters Capable of Being Operated Without Monetary Coins" by Chan; and U.S. Pat. No. 4,967,895, issued on Nov. 6, 1990, entitled "Parameter Control System For Electronic Parking Meter" by Speas.

OBJECTS OF THE INVENTION

It is one object of this invention to provide improved methods and apparatus for entering a consumable energy source into a vehicle.

Another object of this invention is to provide methods and apparatus for selectively inputting messages to a vehicle as a function of user specific information, such as accounting-related indicia, that is electronically maintained within the vehicle.

It is a further object of this invention to provide a vehicle battery charging system wherein user specific information is electronically maintained within the vehicle, and wherein messages are selected for inputting to the vehicle from a battery recharging station as a function of the user specific information.

It is another object of this invention to provide a vehicle refueling system wherein user specific information is electronically maintained within the vehicle, and wherein messages are selected for inputting to the vehicle from a refueling station as a function of the user specific information.

SUMMARY OF THE INVENTION

The foregoing objects of the invention are realized by methods and apparatus for inputting messages and other information, such as advertisements, to a vehicle while the vehicle is coupled to a local station, such as a recharging station or a refueling station. The messages can be selected in accordance with information received from the vehicle, including information that selectively identifies one, some, or all of: (a) a characteristic of an occupant of the vehicle (e.g., name, account number, address, etc.); (b) a characteristic of the vehicle (e.g., make, model, year, class, registration number, marker number, odometer reading, owner, etc.); (c) a destination of the vehicle (entered through a data entry console and optionally stored within a vehicle memory); and (d) any other characteristic of interest.

The use of the invention enables message types to be selected so to target the occupant or occupants of a particular vehicle in an automatic, non-intrusive manner that is transparent to the occupant or occupants of the vehicle. The message types are selected in accordance with information that is output from the vehicle when the vehicle is bidirectionally coupled to the local station. If the vehicle is equipped with a printer, a hard copy of any messages can be generated. In some cases the hard copy may take the form of a promotional message, such as a discount coupon, or as a confirmation copy of a credit card transaction or a reservation for lodging and the like.

BRIEF DESCRIPTION OF THE DRAWING

The foregoing and other features of the invention are made more apparent in the ensuing Detailed Description of the Invention, when read in conjunction with the attached Drawing, wherein:

FIG. 2b is a block diagram illustrating in greater detail the battery charging station of FIG. 2a;

FIG. 4 is a flowchart illustrating the operation of the central controlling station of FIG. 1a;

DETAILED DESCRIPTION OF THE INVENTION

Figure 1A:
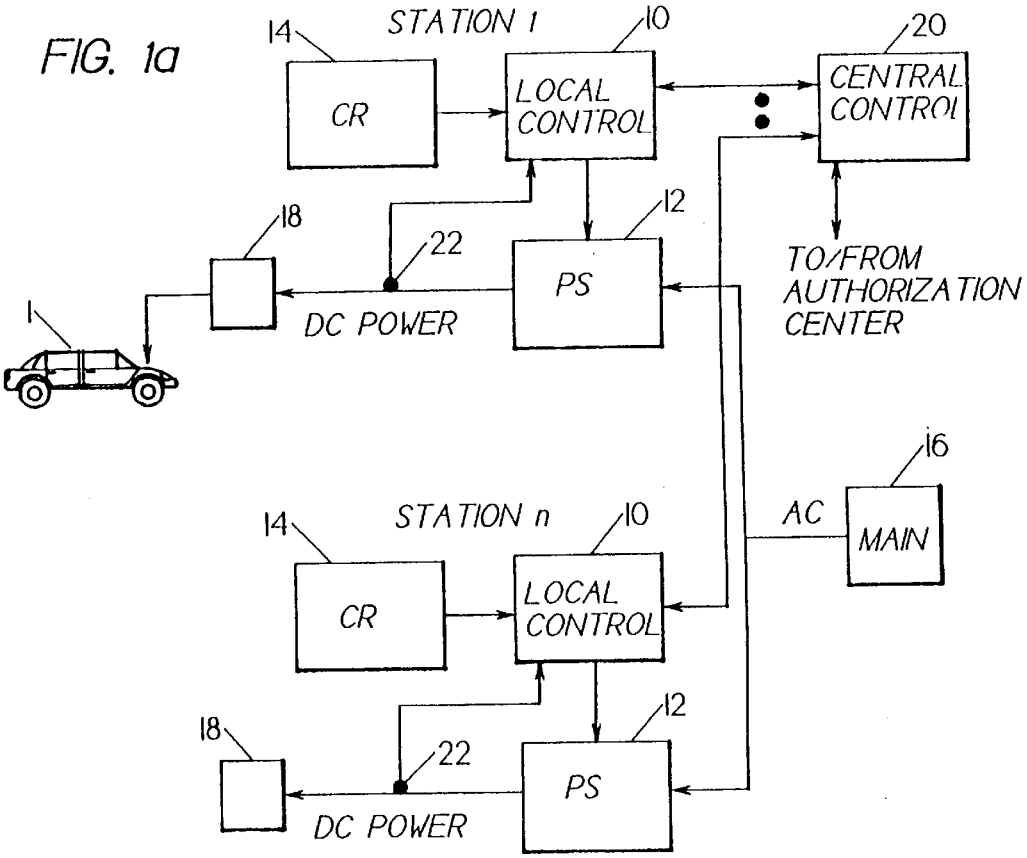
FIG. 1a is a block diagram illustrating the use of a plurality of battery charging stations, wherein indicia received from a consumer-provided card is transmitted to a central controlling station.

Referring to FIGS. 1a, 1b, 3 and 4 there is shown a plurality of battery charging stations, designated Station 1 to Station n, each of which includes a local controller 10, a power supply 12, and a card reader 14. Each power supply 12 receives an AC power input from a main 16. The power supply 12 includes a transformer 12a and a DC power supply 12b. The output of power supply 12 has a voltage potential suitable for recharging a battery within a vehicle 1. A suitable connector 18 is provided for coupling to the battery terminals of the vehicle 1.

The local controller 10 includes a microprocessor 10a, a timer 10b, and an analog-to-digital (A/D) converter 10c. Microprocessor 10a receives an input from the card reader 14, an input from the timer 10b, and an input from the A/D 10c. The microprocessor 10a provides an output to a switching device, such as a relay 12c, that is employed to open and close the transformer 12a circuit. During use, a consumer inserts a card 2 having indicia 3 on a surface thereof. The indicia may be recorded upon a magnetic stripe, a bar code, a series of punched-out openings, or any suitable medium for conveying the user's account number and possibly other information. The card reader 14 senses the indicia 3 and provides an output to the microprocessor 10a, the output being expressive of the information conveyed by the indicia 3. The microprocessor 10a is bidirectionally coupled to a central controller 20 for transmitting the indicia information thereto.

Figure 3:
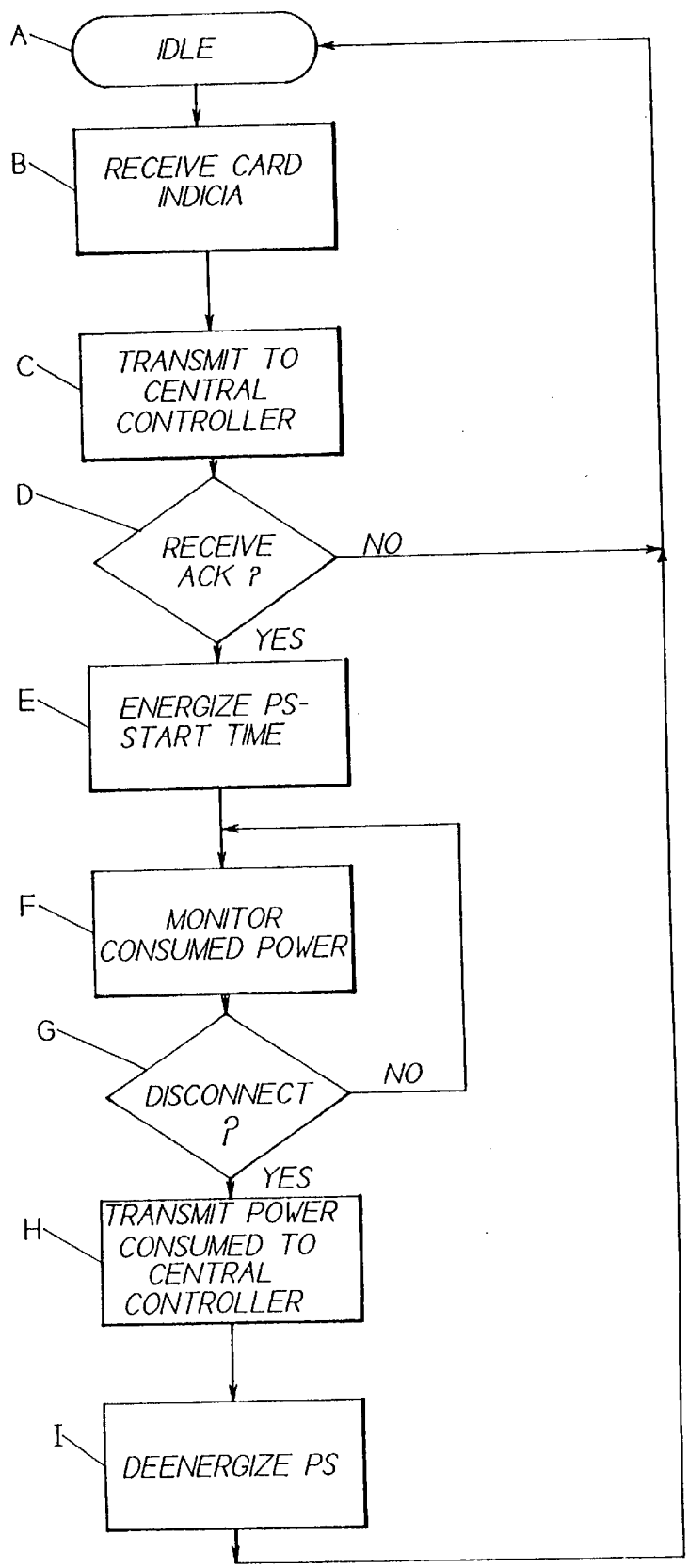
FIG. 3 is a flow chart illustrating the operation of one of the battery charging stations of FIGS. 1a and 1b.

Referring to FIG. 3, in response to the receipt of the digital signal from the card reader 14 the microprocessor 10a exits an IDLE state (A) and receives the digital signal (B). At block C the microprocessor transmits a digital signal to the central controller 20, the digital signal being expressive of information conveyed by the indicia 3.

Figure 4:
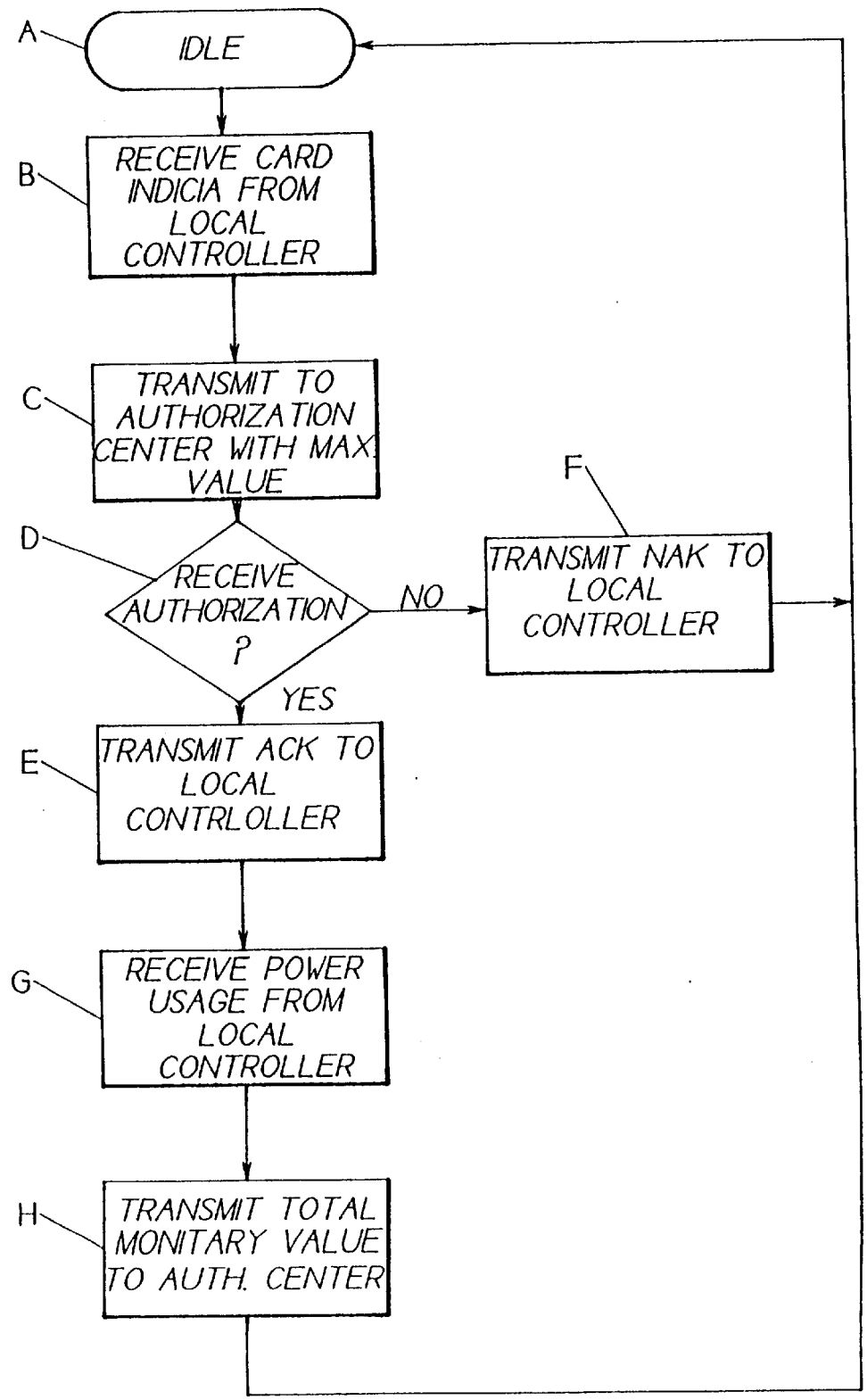

Referring to FIG. 4, in response to the transmission of the indicia information from the microprocessor 10a the central controller 20 exits an idle state (Block A) and receives the card indicia information from the microprocessor 10a (Block B). The central controller 20 transmits the indicia information to a remote authorization center. The central controller 20 may also transmit a maximum monetary value that the consumer will be expected to expend (Block C). The central controller 20 then waits to receive an authorization from the authorization center. If the authorization is received (Block D) the central controller 20 transmits an acknowledge (ACK) signal to the microprocessor 10a of the charging station (Block E). If the authorization is not received the central controller transmits a no acknowledge (NAK) signal to the local controller (Block F) and re-enters the idle state (A).

Returning to the flow chart of FIG. 3, the local controller 10 waits to receive the ACK (Block D) from the central controller 20. If the NAK signal is received instead the local controller 10 re-enters the idle state at Block A and no power is dispensed to the consumer. If the ACK signal is received the microprocessor 10a closes relay 12c so as to energize the DC power supply 12b (Block E). The microprocessor 10a also initiates timer 10b so as to record an amount of time that the power supply 12b is energized. The microprocessor 10a then monitors the power utilized by the consumer. To this end a suitable means is connected to the output of the power supply 12 so as to monitor the current flow from the DC power supply 12b. For example, an inductive pickup 22 may be provided adjacent the power leads, the output of the pickup 22 being indicative of the power flowing through the power leads. A low value resistance may also be inserted in series with a power lead and the voltage potential appearing across the resistance may be measured to obtain an indication of the charging current. It is also within the scope of the invention to instead meter the AC power at the input to the DC power supply 12b. The DC power supply 12b may be embodied within a linear power supply, a switching power supply, or any suitable AC/DC conversion apparatus. If a switching supply is used, the transformer 12a may be eliminated and the switching supply connected directly to the AC power input through a switch controlled by the microprocessor 10a.

For any of these various embodiments an analog signal indicative of the power consumed in recharging the vehicle's battery is converted, by the A/D 10c, to a digital reading that is input to the microprocessor 10a. It should be realized that AC power may be dispensed and metered, instead of DC power, if the vehicle is equipped with a suitable AC/DC converter.

In addition to monitoring the power usage of Block F, the microprocessor 10a operates at Block G to sense a disconnect condition wherein the vehicle battery is disconnected from the connector 18. This can be sensed, by example, by the current going to zero or the voltage rising to an open circuit value. So long as the disconnect is not sensed at Block G the microprocessor 10a continues to monitor the power usage at block F. When the disconnect is sensed at block G the microprocessor 10a transmits a signal to the controller 20, the signal indicating a total amount of power consumed (Block H). The microprocessor 10a then de-energizes the D/C power supply 12b by opening relay 12c (Block I) and reenters the idle state (Block A).

Referring again to FIG. 4, the central controller 20 receives, at Block G, the power usage signal from the microprocessor 10a of the local controller 10. Responsive thereto the central controller 20 transmits to the authorization or accounting center a signal indicative of a total monetary value that is to be charged to the consumer's account (Block H). Other charges may also be incurred in addition to the charge for the dispensed power. By example only, a usage fee or a parking fee may be added. The central controller 20 then reenters the idle state at Block A.

The timer 10b serves a dual function. The output of the timer 10b enables the microprocessor 10a to determine the total Watt-hours of electrical power that are consumed in charging the vehicle's battery. The timer 10b also indicates the amount of time that the vehicle 1 is connected to the charging station. For some applications it may be desirable to also bill the consumer for the amount of time that the vehicle 1 is connected. This may be especially advantageous when the vehicle 1 is connected for a significant period of time beyond what is required to fully charge the battery. For example, if the charging station is located in an airport parking lot the vehicle 1 may be connected for several days or even weeks to the charger, even though during a significant portion of this time only a trickle charge is being applied to the vehicle's battery. For this case, it may be advantageous to also bill the consumer for "connect time", that is, to bill the consumer at an hourly or daily rate, regardless of the amount of power actually being consumed.

The card 2 presented by the consumer may be a conventional credit card. The card 2 may also be an Automatic Teller Machine (ATM) card, in which case the billed amount may be debited from a corresponding bank account maintained by the consumer. Also, the card 2 presented by the consumer may be a card especially issued to the consumer solely for the purpose of recharging the battery within the consumer's vehicle. That is, an electric utility may issue the card and the recorded charges may appear on the consumer's monthly statement. Alternatively, an organization that installs and maintains the charging stations may issue the card to the consumer, and subsequently bill the consumer for consumed power.

As employed herein an indicia representative of a monetary value is intended to encompass information recorded upon a substrate, such as a credit card; a bank account number recorded upon an ATM card; data stored within a memory device of a credit card or a memory device of the vehicle itself; an account number or an authorization number directly input by a consumer via a data entry device, such as a keypad or the like; and any other information that enables an account associated with a consumer to be charged or debited.

Figure 1B:
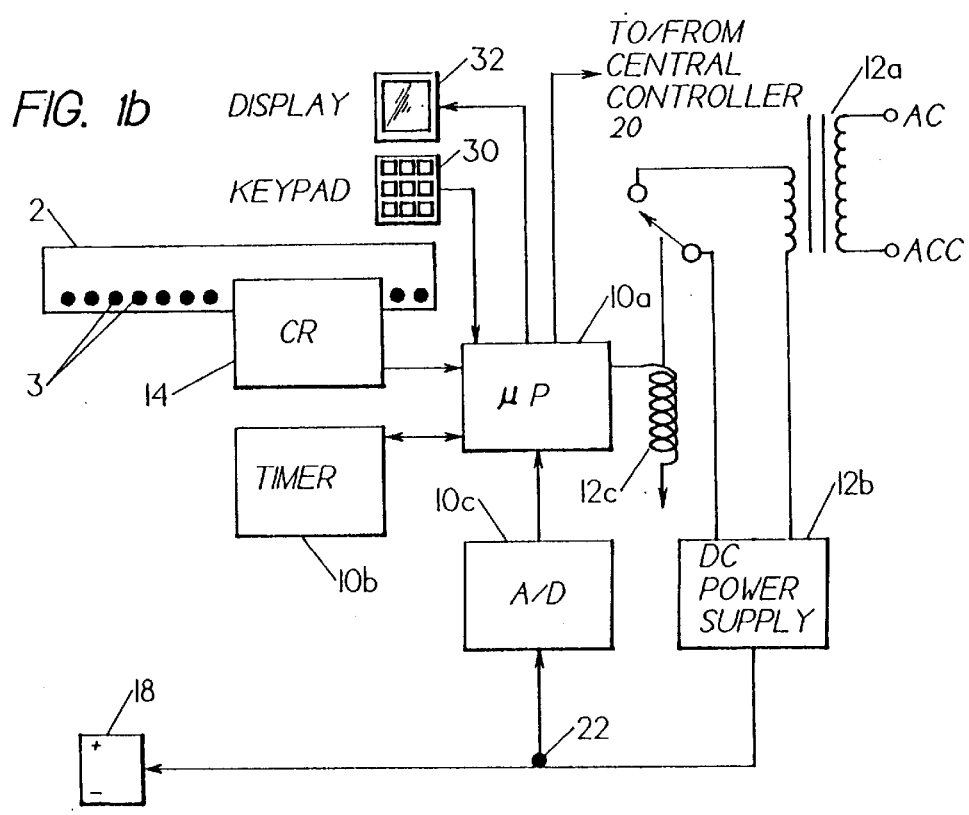
FIG. 1b is a block diagram illustrating in greater detail one of the charging stations of FIG. 1b.
Figure 2A:
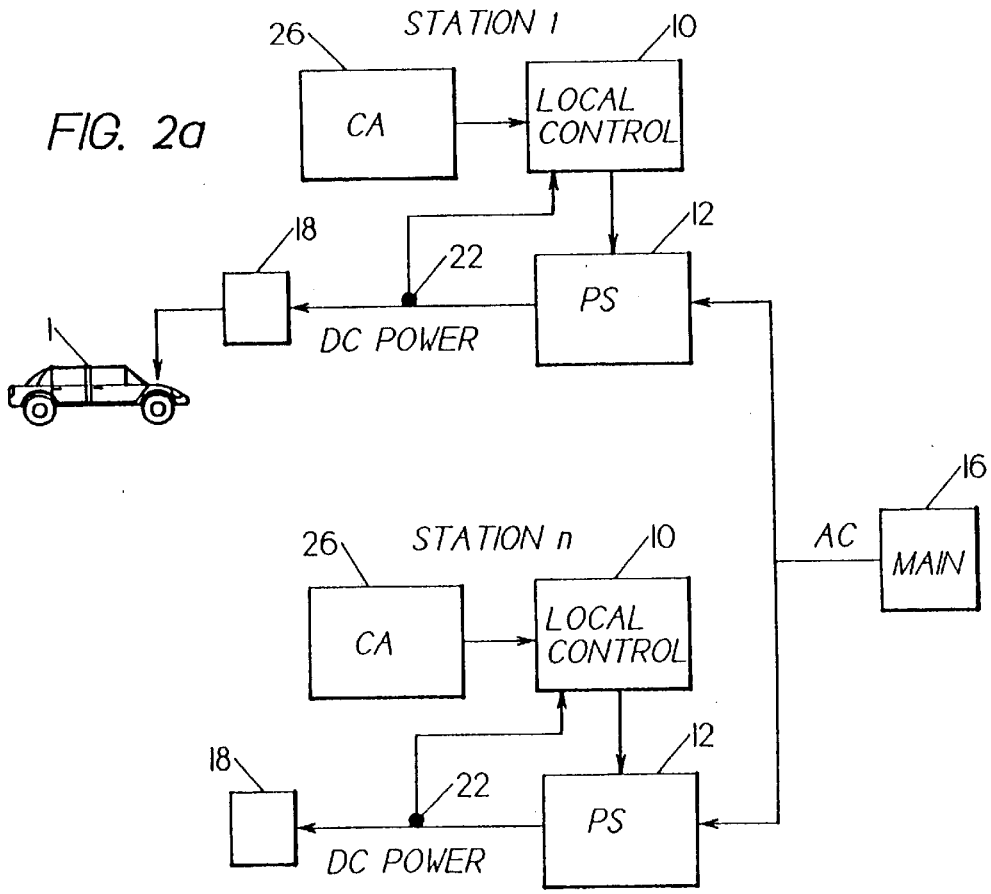
FIG. 2a is a block diagram showing an embodiment wherein a battery changing station debits a monetary balance stored within a consumer-provided card.
Figure 2B:
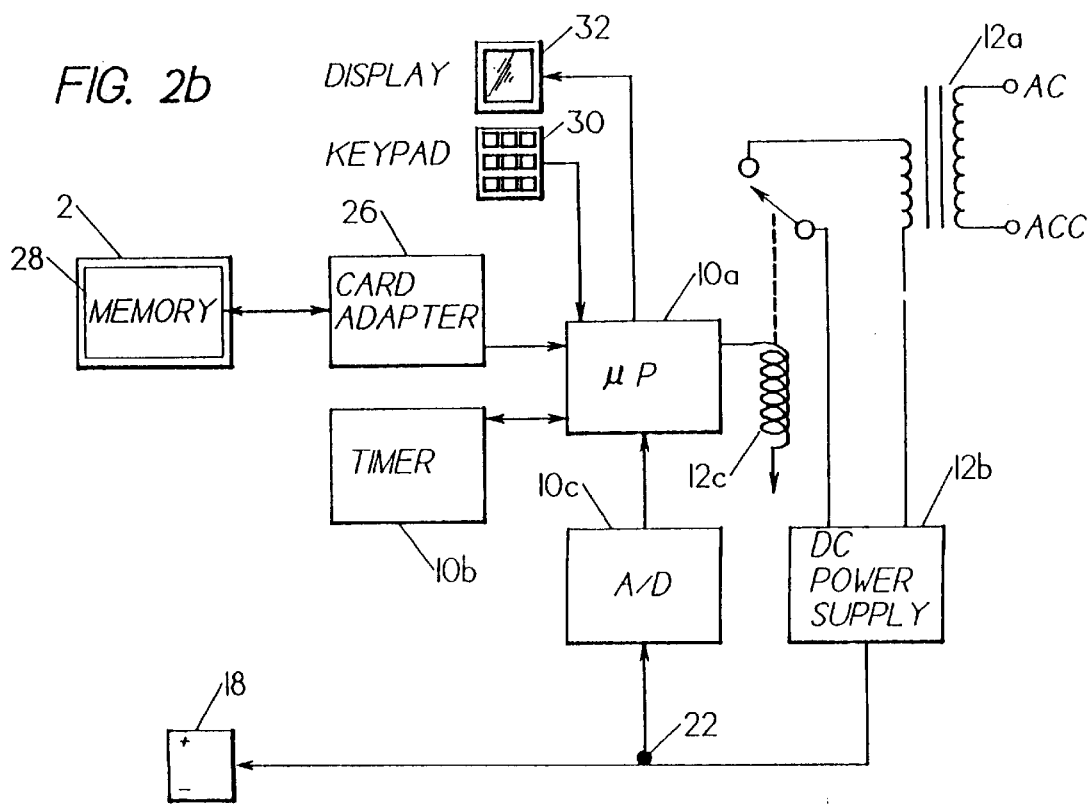

Referring now to FIGS. 2a and 2b there is illustrated a further embodiment, wherein components found also FIGS. 1a and 1b are numbered accordingly. In this embodiment each of the plurality of charging stations includes a card adapter 26. For this embodiment the local controller 10 is not required to be coupled to a central controller 20 or to an authorization center, in that the local controller 10 directly debits a monetary value stored within a memory 28 that is contained within the consumer's card 2. This embodiment is suited for use in, but not limited to, an application wherein a predetermined amount of power is provided to the consumer. That is, the local controller 10 initially debits the consumer's card by some predetermined monetary value, prior to dispensing power. When the microprocessor 10a determines that the billed amount of power has been consumed, the microprocessor 10a deactivates the DC power supply.

Figure 5:
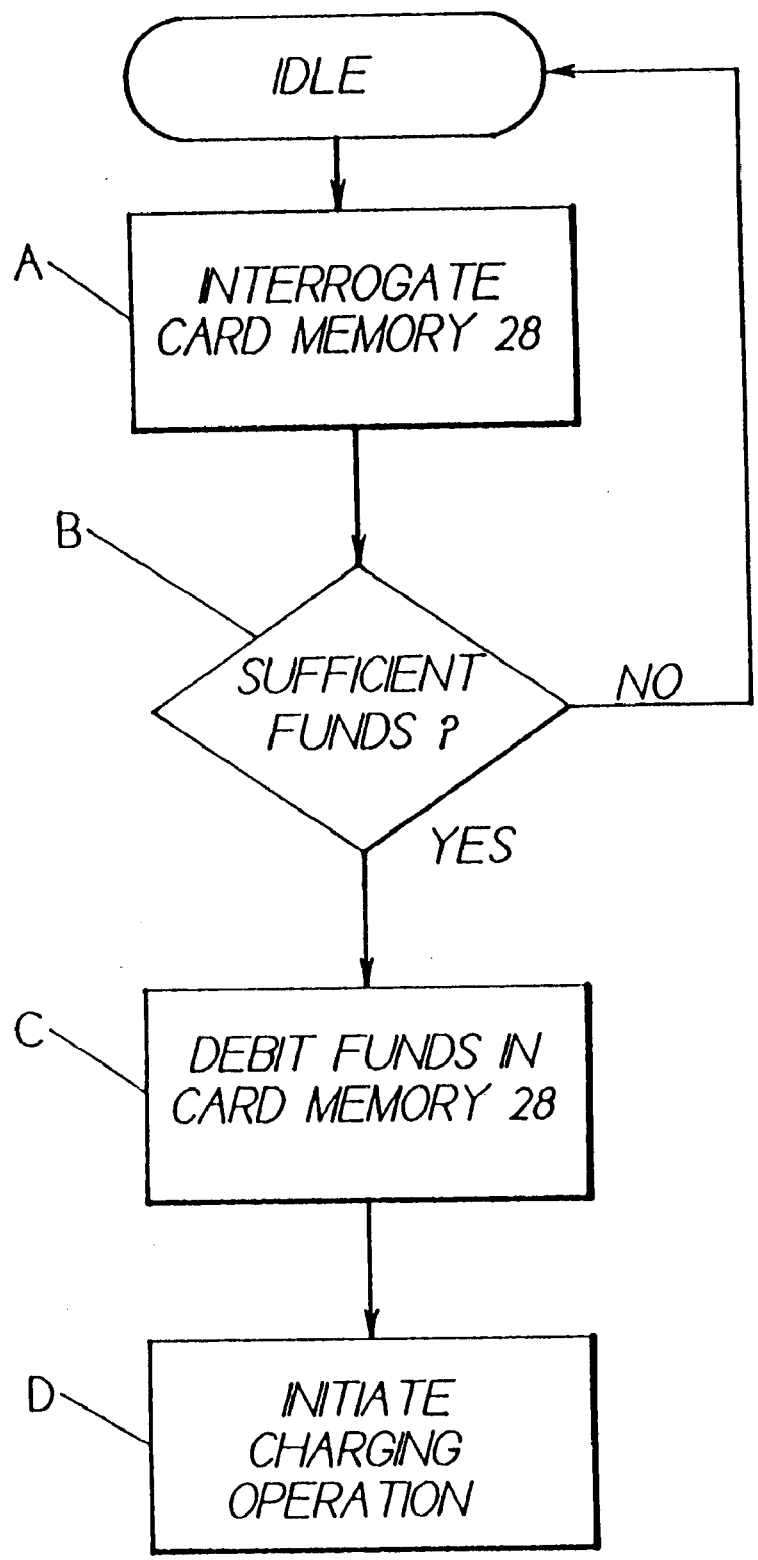
FIG. 5 is a flowchart illustrating the operation of the battery charging station of FIG. 2b.

In operation, and referring to FIG. 5, the microprocessor 10a interrogates the card memory 28 (Block A) to determine if the stored balance is at least equal to the amount to be debited (Block B). If this condition is satisfied, the microprocessor 10a debits the memory by the required monetary value (Block C) and initiates the charging operation (Block D). Pre-billing the consumer is desirable in that the consumer may purposely or inadvertently disconnect the charging station from the vehicle's battery, without also inserting the card into the card adapter 26.

It is within the scope of this teaching to consolidate the functionality of the plurality of local controllers 10, in particular the microprocessors 10a, into the central controller 20. For this embodiment each STATION includes a card interface device, such as the card reader 14 or card adapter 26, and also, preferably, the power supply 12. The central controller 20 is responsible for receiving input from the various card interfaces and for remotely activating the associated DC power supplies 12 to dispense power. For installations spread over a considerable distance the DC power supply 12 is preferably provided within each local STATION so as to reduce voltage drops between a centrally located power supply and the battery terminals. However, for small installations comprising a few stations in close proximity, wherein the DC voltage drops are not excessive, the central controller 20 may also include one or more of the DC power supplies. In one still further embodiment of the invention the central controller may be eliminated altogether, with each local controller communicating directly with the credit card authorization center, or operating autonomously to debit the consumer's balance within the card memory. Another embodiment includes one or more card interface devices in association with the central controller 20, and not the local controller 10.

A still further embodiment provides a data entry device, such as a keypad 30 (FIG. 1b), at each local STATION or at the central controller 20 whereby a consumer is enabled to enter a personal or an organizational account code against which a monetary charge is to be made. The data entry device may also be employed to enter other information, such as a type of battery that is installed within the vehicle so that, by example, the voltage level or the battery charging rate may be set by the local or the central controller. A data output device, such as an LCD display 32 (FIG. 1b), may also be employed for communicating information to the consumer, such as instructions or an indication of the amount of money to be charged to the consumer.

Figure 6:
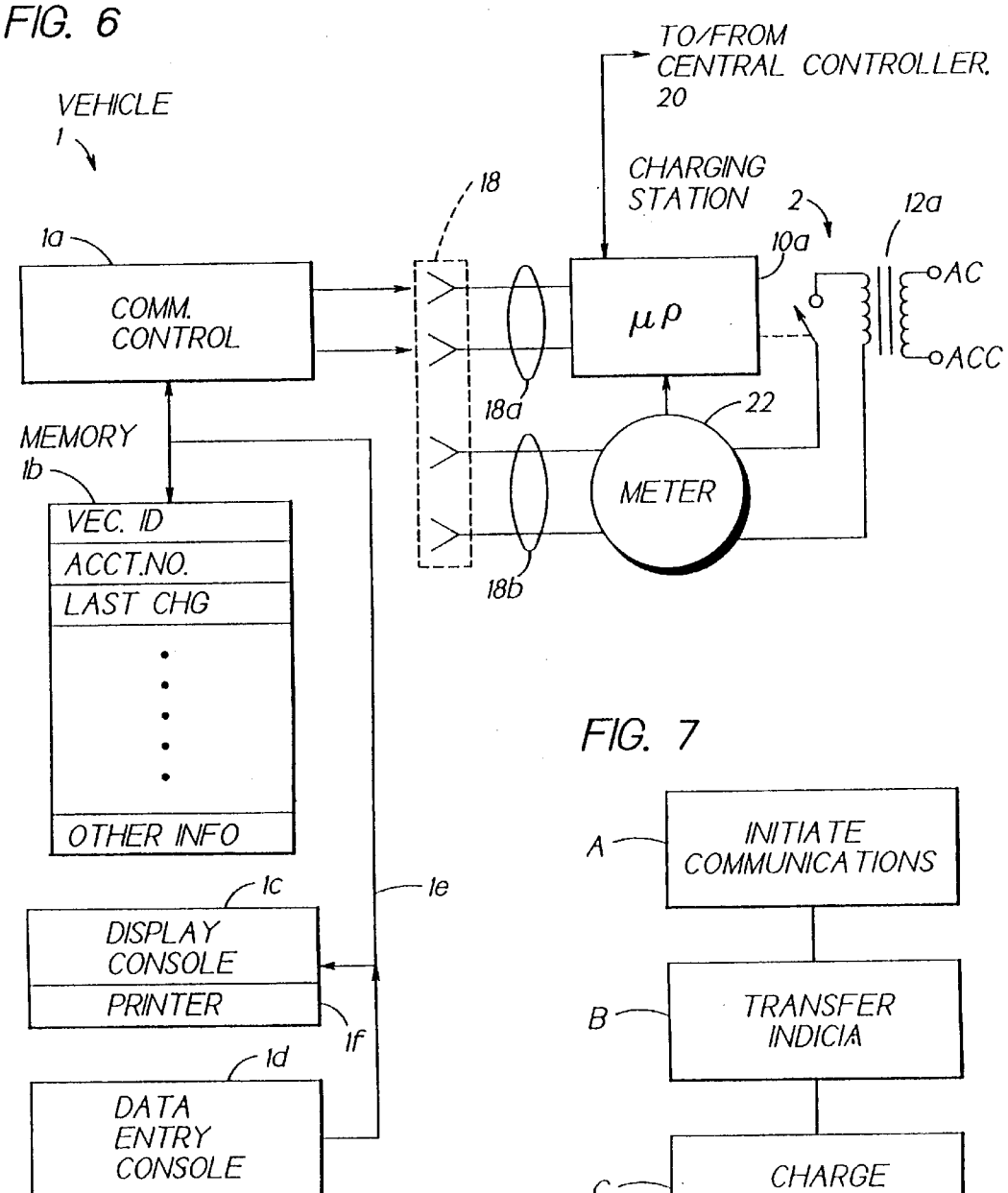
FIG. 6 is a block diagram illustrating a battery charging station and a vehicle, wherein information is transferred between the vehicle and the battery charging station.
Figure 7:
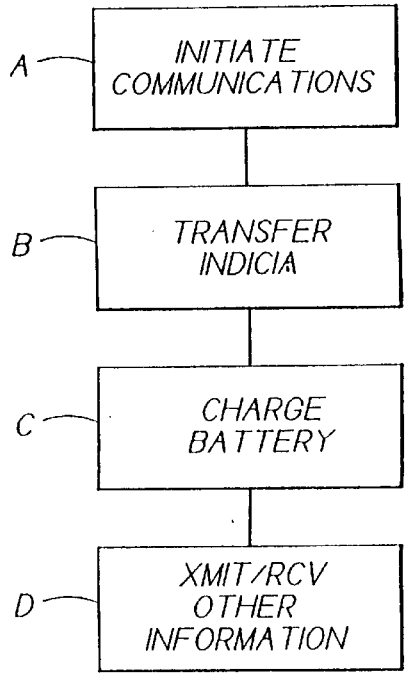
FIG. 7 is a flowchart illustrating the operation of the battery charging station and vehicle of FIG. 6.

In a still further embodiment, and referring to FIGS. 6 and 7, a battery charging station and a vehicle are provided wherein information is transferred between the vehicle and the battery charging station.

In this embodiment the connector 18 includes a data communications portion 18a and a power dispensing portion 18b. AC power is dispensed from the transformer 12a, and a meter 22 provides an indication of the dispensed power to the microprocessor 10a. The data communications portion 18a of the connector 18 is coupled to the microprocessor 10a. The vehicle 1 includes a communication controller 1a that is coupled to the microprocessor 10a through the data communications portion 18a of the connector 18. The vehicle 1 also includes a memory 1b that stores user-specific information. The user specific information includes a vehicle identification (VEC. I.D.) and, for example, an account number (ACCT. NO.). The memory 1b may also store other information, such as information relating to a last charging operation (LAST CHG), with which the communications controller 1a is enabled, in conjunction with an odometer reading and the current charging information, to monitor the energy efficiency of the vehicle 1. To this end the vehicle may also include a display console 1c, such as an LCD display or a video monitor, which is used to display the energy usage and efficiency to the user. The vehicle may also include a data entry console 1d. A bus 1e couples together the communications controller 1a, memory 1b, display console 1c and data entry console 1d. The data entry console 1d can be employed by the user to initiate a transfer of information from the vehicle 1 to the charging station 2, such as a transfer of the ACCT. NO. Alternately, this transfer can be accomplished automatically by the communications controller 1a in concert with the microprocessor 10a.

Referring to FIG. 7, at Block A the user connects the vehicle 1 to the charging station 2. Responsive to the connection, communications are initiated by the microprocessor 10a by interrogating the communications controller 1a for the ACCT. NO. information stored in the memory 1b. The VEC. I.D., and also optional other information, may be transferred from the vehicle 1 to the charging station 2 via the data communications portion 18a of the connector 18 (Block B). In response to the received indicia, the microprocessor 10a communicates with the central controller 20 to verify the ACCT. NO. Assuming that the ACCT. NO. is verified, the microprocessor 10a activates the transformer 12a, the battery of the vehicle 1 is charged, and the meter 22 is read to obtain an indication of the dispensed power (Block C). An accounting is then made in cooperation with the previously received indicia.

At the completion of the charging cycle, the communications controller 1a is enabled to determine the energy efficiency of the vehicle, based on information received from the microprocessor 10a and internal odometer readings. In this manner the communications controller 1a is enabled to detect abnormal battery or vehicle conditions. Any pertinent information can be displayed to the user through the use of the display console 1c. The communications controller 1a then updates the LAST CHG information stored within the memory 1b. At Block D, an optional step of transferring other information is executed, it being realized that Block D may be executed prior to the completion of the battery charging operation.

The execution of Block D enables a number of valuable operations to be performed. One operation enables the central controller 20 to transmit unsolicited or solicited advertisements to the vehicle 1 for display on the display console 1c. By example, the names of lodgings, restaurants, and/or recreational areas within a predetermined radius of the charging station 10 can be displayed to the user. In response, the user can employ the data entry console 1d to make further inquiries as to location, rates, etc. Further by example, using predetermined keystrokes the user can reserve a room at a selected lodging, and can initiate a transfer of the stored ACCT. NO., or another account number, to be relayed to the selected lodging via the microprocessor 10a and the central controller 20. A confirmation number may then be relayed from the selected lodging, via the central controller 20, to the vehicle 1 for display on the display console 1c. An optional printer device 1f can also be employed to provide a hard copy of the confirmation number, and/or to provide a copy of addresses, rates, billing information, etc. The optional printer device if may also be employed to provide the user with discount coupons, advertising literature, the location of and distance to other charging stations, etc.

Another operation that is enabled by the execution of Block D is the transmission and/or reception of other information in the form of messages. For example, a party wishing to contact an occupant of the vehicle 1 transfers a message to the central controller 20, the message including the VEC. I.D., the ACCT. NO., or some other identifying information. The message and identifying information is stored within the central controller 20. The other identifying information can include, by example, the vehicle's license plate number, the name of the driver, a telephone number, or the name of a passenger. In this regard, the vehicle operator can manually enter other identifying information into the memory 1b with the data entry console 1d. By example, before beginning a journey the operator can enter the names of any passengers into the memory 1b.

In response to receiving the message, the central controller 20 monitors incoming communications from charging stations 20 to identify a transmission from the vehicle to which the stored message is directed. When operating in this mode the communications controller 1a transfers all identification-related information from the memory 1b to the central controller 20, via the microprocessor 10a. When the central controller 20 identifies a transmission from the vehicle having the stored message, the central controller transfers the stored message to the vehicle 1 for display and optional printing. An acknowledgement signal may be automatically or manually generated within the vehicle for transmission back to the central controller 20.

If the central controller 20 determines that a last charging operation was accomplished at a charging station within a predetermined distance from a periphery of an area served by the central controller 20, the central controller may 20 may relay the stored message to another central controller within an adjacent area. In this manner the message can be relayed to one or more additional central controllers for eventual delivery to the vehicle 1. In like manner an acknowledgement signal can be relayed back to the originating central controller.

Initiating a message within the vehicle 1 is accomplished by the operator employing the data entry console 1d to enter a message and an address of the message destination, such as telephone number or the identification of another vehicle. The message and identifying information are temporarily stored in the memory 1b. During a next charging operation the stored message information is relayed from the communications controller 1a, via the microprocessor 10a, to the central controller 20 for delivery. If delivery is accomplished during the charging operation, then an acknowledgement signal may be transferred immediately back to the vehicle 1 for display to the operator. If message delivery is delayed, then the acknowledgment signal is stored within the central controller 20 for delivery to the vehicle 1 during a next charging operation at another charging station.

Figure 8:
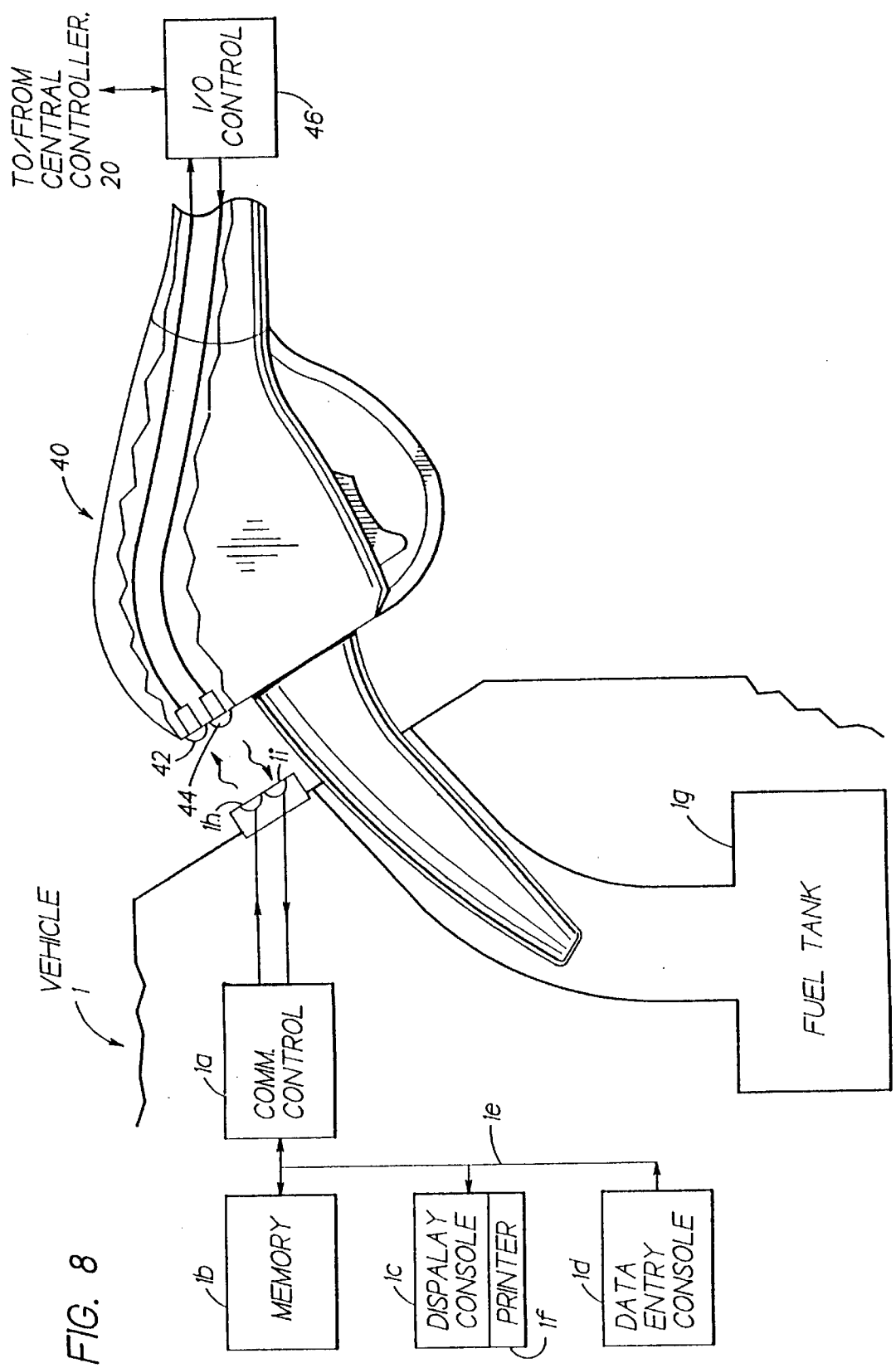
FIG. 8 is a block diagram illustrating a fueling station and a vehicle, wherein information is transferred between the vehicle and the fueling station.

FIG. 8 illustrates the teaching of this invention as applied to a fueling station for a vehicle 1 having an internal combustion engine and a fuel tank 1g. In this embodiment of the invention the direct electrical connection provided by the data communications portion 18a of connector 18 is eliminated, and replaced with an optical, infrared (IR)

radiation data link. To this end a fuel nozzle 40 includes an IR receiver 42 and an IR transmitter 44 that provide bidirectional data communications with corresponding IR transmitter 1h and IR receiver 1i. IR transmitter and receiver 1h and 1i are positioned on the vehicle 1, with respect to the normal position of the nozzle 40 during a fueling operation, so as to enable bidirectional bit serial data communications between communications controller 1a and an I/O controller 46 located at, or near to, the fuel pump. I/O controller 46 is in bidirectional communication with the central controller 20, as in the embodiment of FIG. 6.

The vehicle 1 includes the memory 1b, display console 1c, data entry console 1d, bus 1e, and optional printer 1f, and operates as described above with respect to the flow chart of FIG. 7, with modifications being made for dispensing a liquid fuel instead of electrical power. That is, account number information is automatically transferred between the vehicle 1 and the remote controller 20 during a fueling operation. The fueling station also transmits an amount of liquid fuel that is provided to the fuel tank 1g. Other information can also be transferred, such as advertisements, lodging information, confirmations, and messages to or from an occupant of the vehicle.

It can be realized that the interconnection between the vehicle 1 and the charging station 2 may be provided in a number of suitable embodiments, including a low power RF link and an inductive transmitter and receiver. The use of a wireless connection, as opposed to a direct electrical connection, is preferred in the embodiment of FIG. 8 to avoid a possibility of generating a spark during the coupling and uncoupling of the nozzle 40, and also to accommodate the various positions that the nozzle 40 may assume during the fueling operation.

Figure 9:
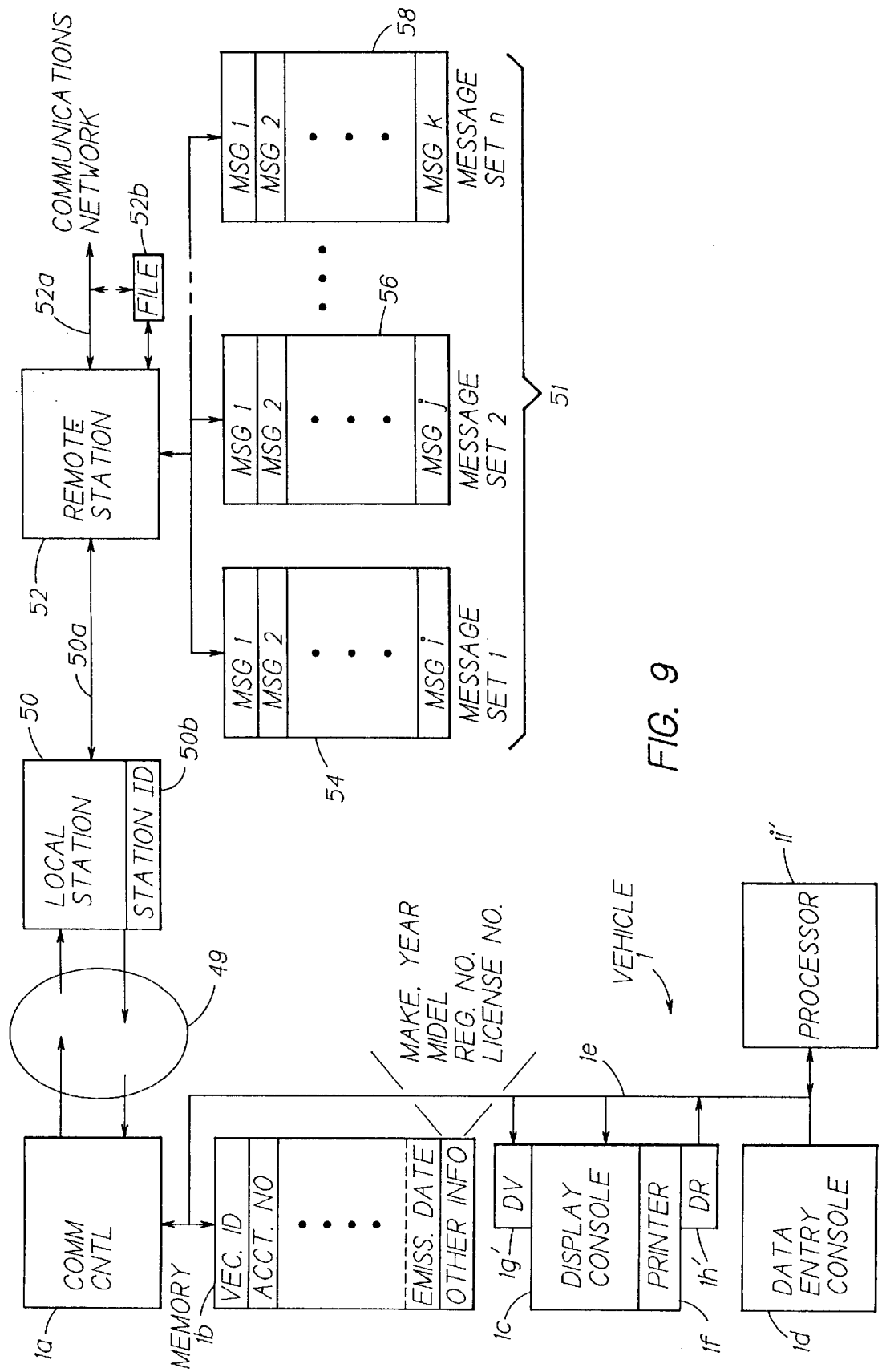
FIG. 9 is a block diagram of an embodiment of the invention wherein user-specific information is used to select messages for inputting to the vehicle.

Reference is now made to FIG. 9 for illustrating a further embodiment of this invention. Components that function as in FIG. 6 are numbered accordingly. In this embodiment the vehicle 1 is bidirectionally coupled at 49 to a local station 50 (e.g., battery recharging station, refueling station, etc.) which, in turn, is bidirectionally coupled to a remote station 52. The remote station 52 is bidirectionally coupled to a data base 51 having a least one message set comprised of at least one message. The nature of the coupling at 49 may a direct electrical connection, or by a wireless technique such as optical, RF, magnetic, induction, or the like.

In the illustrated embodiment the data base 51 is comprised of a Message__Set__1 54, a Message__Set__2 56, up to a Message__Set__n 58. Message__Set__1 54 is comprised of MSG__1 to MSG__i, Message__Set__2 56 is comprised of MSG__1 to MSG__j, and Message__Set__n 58 is comprised of MSG__1 to MSG__k. By example, a given one of the messages may be an advertisement or a public service message. Also by example, the messages of Message__Set__1 54 are messages that are predetermined to be of potential interest to many or all users of the local station 50, while the messages of Message__Set__2 are messages that are predetermined to be of potential interest to a first class of users of the local station 50, and the messages of Message__Set__n are messages that are predetermined to be of potential interest to another class of users of the local station 50.

In accordance with an aspect of this invention, selection between message sets 54–58, and possibly also between messages of a given message set, is made by the remote station 52 in accordance with information that is transferred from the vehicle 1, through the local station 50, during a time that the vehicle is bidirectionally coupled to the local station 50. The transferred information selectively identifies one, some, or all of: (a) a characteristic of an occupant of the vehicle (e.g., name, account number, address, etc.); (b) a characteristic of the vehicle (e.g., make, model, year, class, registration number, marker number, odometer reading, owner, etc.); (c) a destination of the vehicle (entered through the data entry console 1d and optionally stored within the memory 1b); and (d) any other characteristic of interest.

By example, the Other Information that is stored within the memory 1b can include the make, year and model number of the vehicle 1, the registration number, and possibly the license or marker number. A large variety of Other Information can be provided, either as "fixed information" (for example, information stored into the memory 1b by the automobile manufacturer or dealer), or "variable information" (for example, information stored into the memory 1b by the owner and/or operator of the vehicle through, for example, the data entry console 1d). The owner and/or user supplied information can include, by example only, a name of an occupant of the vehicle 1, a destination for the vehicle, or a specific inquiry for the data base 51 (for example, list all motels within a 20 mile radius of the local station 50).

In response to the information that is transferred from the vehicle 1, the remote station 52 is enable to select one or more messages from one or more of the message sets. The selected message or messages are then transferred from the remote station 52 to the local station 50. The message or messages can be displayed at the local station 50, or can be inputted to the vehicle for storage, display and possible printing.

As an example, the messages of Message__Set__1 54 may be messages that are of interest to all users of the local station 50, for example local weather reports, road conditions, traffic conditions, etc. The messages of Message__Set__2 56 may be messages that are determined to be of greatest potential interest to occupants of vehicles within a predetermined first class of vehicles, such as station wagons and passenger vans. The messages of Message__Set__n 58 may be messages that are determined to be of greatest potential interest to occupants of vehicles within a predetermined second class of vehicles, such as "luxury" vehicles, or to drivers of vehicles within a predetermined third class of vehicles, such as "sports" vehicles or commercial vehicles.

As an example of the utility of this aspect of the invention, one of the messages of one of the message sets can be the name and address of a local dealer or repairman that services the same make of vehicle that is indicated by indicia transferred from the vehicle to the remote station 52.

In another or same embodiment of this invention the registration information or the marker information that is stored within the memory 1b of the vehicle 1 can be used to distinguish "local" vehicles from all other vehicles. In this regard a "local" vehicle may be one that is registered or garaged within some predetermined distance of the local station 50, or within some predetermined geographical region (county, state, town, etc.). For this embodiment at least one first message set is directed to vehicles identified to be local vehicles, while at least one second message set is directed to all other vehicles. By example, the first message set could include messages and advertisements relating to local merchants, local events, and local news items, while the second message set could include messages and advertisements of greatest interest to non-local vehicle occupants, such as the names and locations of lodgings and highway restaurants.

It can be appreciated that some of the message types that are delivered to a local station 50 that is located along an interstate highway may differ significantly from some of the message types delivered to a local station 50 that is located within a large urban area. In like manner, some of the message types provided within a recreational or tourist area may differ significantly from some of the message types delivered within an agricultural area or an industrial area.

It is anticipated that one or more organizations would be responsible for soliciting businesses and the like to sell or rent message space for delivery to vehicles. The use of the demographics provided by the information output from the vehicle 1 enables particular suppliers of goods and services to readily target a predetermined class or classes of vehicle occupants.

As such, the use of this aspect of the invention enables message types to be selected so to target the occupant or occupants of a particular vehicle in an automatic, non-intrusive manner that is transparent to the occupant or occupants of the vehicle. The message types are selected in accordance with information that is output from the vehicle 1 when the vehicle 1 is bidirectionally coupled to the local station 50. If equipped with the printer 1f, a hard copy of any messages can be generated. In some cases the hard copy may take the form of a promotional message, such as a discount coupon, or as a confirmation copy of a credit card transaction or a reservation for lodging and the like.

The remote station 52 can be provided with a communications link 52a for inputting messages to the vehicle 1 from a remote source of messages, and for outputting messages from the vehicle 1 to a remote receiver of messages. The communications network 52a also provides other functions, such as enabling the vehicle's registration number to be checked against a list of registration numbers associated with vehicles that have been reported as missing or stolen. In the event of a match the remote station 52 is enabled to generate a message and transmit same to local authorities informing them of the presence of the vehicle 1 at the local station 50. The local station 50 can be readily identified by a Station ID data field 50b that is transmitted from the local station 50, along with the information that is received from the vehicle 1.

The communications network also enables the remote station 52 to gain access to other repositories of information, such as more specific information about the occupant of the vehicle 1. By example, based on the Account Number information that is received from the vehicle a profile of the occupant may be obtained from a separate data base that is maintained by the supplier of the Account Number. In this manner the remote station 52 is enabled to more accurately select messages that accurately reflect those goods and services that may be of greatest interest to the occupant of the vehicle 1.

If a refueling or recharging operation is also accomplished then accounting-related data can also be transferred from the vehicle 1 and the local station 50. It should be realized that the remote station 52 may also be responsible for performing the accounting function, although the accounting function could be accomplished by another station altogether. It should also be appreciated that it is not necessary that a refueling or recharging operation be accomplished in order to make use of the message input and output capabilities that is provided by the system illustrated in FIG. 9 (and also in FIGS. 6–8). It should be realized that the functionality of the remote station 52 can be incorporated entirely or in part within the local station 50. That is, the data base 51 can be resident within the local station 50, and the message selection operation is then accomplished within the local station 50. Furthermore, message display and optional printing can be accomplished at the local station 50 in lieu of, or as an adjunct to, the display and optional printing of messages within the vehicle 1.

Based upon the foregoing detailed description of several embodiments of this invention, it is anticipated that those having skill in the art could derive modifications to these embodiments. For example, in an embodiment of this invention not described heretofore an occupant of the vehicle 1 employs the data entry console 1d to initiate a query for one or more stock market quotations. This can be accomplished by (a) entering the ticker symbols of individual stocks; by (b) causing a pre-stored list of ticker symbols to be transferred from the memory 1b to the remote station 52; or by (c) identifying to the remote station 52 a file 52b that contains a list of stock ticker symbols. The file 52b may be locally stored at the remote station 52, or may be remotely maintained by some other system, for example within a memory of a networked (coupled to communications network 52a) personal, mini, or mainframe computer that is located at a great distance from the local station 50 and/or the remote station 52.

In response to the query message that is transmitted from the vehicle 1, via the interface 49 and local station 50, the remote station 52 employs the communications link 52a to access and retrieve the requested quotations from a conventional source of such information. The requested quotations are then inputted into the vehicle 1 for display to the occupant. In this regard, the quotations are preferably stored in the memory 1b wherefrom they can be individually retrieved by the occupant via the data entry console 1d. For this embodiment the display console 1c can include circuitry 1g' for providing a digitized voice (DV) audio signal, thereby freeing the occupant from having to read the quotations. As such, the memory 1b is employed to store or cache information received from the local station 50 for subsequent display and/or playback to the occupant of the vehicle 1.

It can be realized that the provision of digitized audio playback capability enables voice messages, advertisements and the like to be stored into the memory 1b for subsequent playback to the occupant of the vehicle 1. In like manner a microphone and an audio to digital converting and recording (DR) circuit 1h' can be provided to generate a digitized voice message from an occupant of the vehicle for transfer through the interface 49 and local station 50.

As the complexity of the vehicle 1 increases, a suitably programmed processor (PROC) 1i' is utilized to manage the flow of information both within the vehicle 1, and also to and from the local station 50, via the communications controller 1a and the interface 49.

In view of the foregoing description, it is intended that this invention not be construed to be limited only to the specific embodiments described above, but is instead to be given a scope commensurate with the several claims that follow.

What is claimed is:

1. A method for providing a stock market quotation to an occupant of a vehicle, comprising the steps of:

activating a user interface within the vehicle for initiating a request for a stock market quotation;

transmitting the request from the vehicle, via a data communications interface with a dispenser of a vehicular energy source, to a computer that is bidirectionally coupled to a data communication network;

transferring the request from the computer to a source of stock market quotations, the transferred request being routed over the data communication network;

fulfilling the request at the source of stock market quotations and transferring the requested stock market quotation back to the computer, the requested stock market quotation being routed over the data communication network;

transmitting the requested stock market quotation from the computer to the vehicle;

receiving the requested stock market quotation in the vehicle and storing the received requested stock market quotation within a memory device of the vehicle; and presenting the stock market quotation, that is stored in the memory device of the vehicle, within the vehicle in a human perceptible format.

2. A method as in claim 1, wherein the step of transmitting the request comprises an initial step of bidirectionally coupling the vehicle to the dispenser of a vehicular energy source, the dispenser being bidirectionally coupled to the computer.

3. A method as in claim 1, wherein the step of transmitting the request comprises an initial step of bidirectionally coupling the vehicle to the dispenser of a vehicular energy source, the dispenser comprising the computer.

4. A method as in claim 1, wherein the step of transmitting the request comprises an initial step of bidirectionally coupling the vehicle to a vehicle fuel dispenser, the fuel dispenser being bidirectionally coupled to the computer.

5. A method as in claim 1, wherein the step of transmitting the request comprises an initial step of bidirectionally coupling the vehicle to a vehicle fuel dispenser, the fuel dispenser comprising the computer.

6. A method as in claim 1, wherein the step of transferring the request includes a step of transferring additional information to the computer, the transferred additional information comprising a portion that contains at least an identification of a person initiating the request.

7. A method as in claim 1, wherein the step of receiving and storing further comprises a step of transmitting an acknowledgement signal to the computer.

8. A method as in claim 1, wherein the step of presenting includes a step of displaying the stock market quotation within the vehicle.

9. A method as in claim 1, wherein the step of presenting includes a step of printing the stock market quotation within the vehicle.

10. A method as in claim 1, wherein the step of presenting includes a step of synthesizing a voice for articulating the stock market quotation within the vehicle.

11. A method as in claim 1, wherein the step of activating includes a step of entering an identification of a stock for which a quotation is desired, and wherein the transmitted request is comprised of the identification of the stock.

12. A method as in claim 1, wherein the step of activating includes a step of entering a ticker symbol of a stock, and wherein the transmitted request is comprised of the ticker symbol of the stock.

13. A method as in claim 1, wherein the step of activating includes a step of retrieving a stored list comprised of at least one ticker symbol identifying at least one stock, and wherein the transmitted request is comprised of the at least one ticker symbol identifying the at least one stock.

14. A method as in claim 1, wherein the step of activating includes a step of identifying a stored list comprised of at least one ticker symbol identifying at least one stock, and wherein the transmitted request is comprised of the at least one ticker symbol identifying the at least one stock.

15. A method as in claim 1, wherein the step of activating includes a step of identifying a file stored in a memory, the file comprising a stored list comprised of at least one ticker symbol identifying at least one stock.

16. A method as in claim 1, wherein the step of activating includes a step of identifying a file stored in a memory device that is external to the vehicle, the file comprising a stored list comprised of at least one ticker symbol identifying at least one stock.

17. A method as in claim 1, wherein the step of activating includes a step of providing information for enabling the same or another computer that is coupled to the data communication network to retrieve a stored list comprised of at least one ticker symbol identifying at least one stock.

18. A method as in claim 1, and further comprising steps of:

transmitting a promotional message to the vehicle;

receiving the promotional message in the vehicle and storing the received promotional message within the memory device of the vehicle; and presenting the promotional message, that is stored in the memory device of the vehicle, within the vehicle in a human perceptible format.

19. A system for providing securities quotations to occupants of vehicles, comprising in combination:

a computer operable for obtaining quotations of identified securities, said computer being bidirectionally coupled to a data communication network;

a dispenser of a vehicular energy source, said dispenser comprising a first data interface, said dispenser being bidirectionally coupled to said data communication network;

a vehicle comprising a second data interface for being bidirectionally coupled to said first data interface of said dispenser; and a control unit for transferring information from said vehicle to said computer via said first data interface, said second data interface, said dispenser and said data communication network, the transferred information comprising information for use in identifying at least one security for which a quotation is desired; wherein said computer is responsive to the information for obtaining a quotation for the identified at least one security and for transmitting the obtained quotation towards said dispenser over said data communication network so that said quotation can be presented to the occupant of said vehicle.

20. A system as in claim 19, wherein said vehicle further comprise s a memory for storing a received quotation, and a user interface for presenting the stored quotation.

21. A system as in claim 19, and further comprising a display device for displaying the quotation with at least one of said vehicle or said dispenser.

22. A system as in claim 19, and further comprising a printer device for printing the quotation with at least one of said vehicle or said dispenser.

23. A system as in claim 19, wherein said first and second data interfaces are each comprised of an optical connector means.

24. A system as in claim 19, wherein said first and second data interfaces are each comprised of an RF connector means.

25. A system as in claim 19, wherein said first and second data interfaces are each comprised of an electrical connector means.

26. A system as in claim 19, wherein said first and second data interfaces are each comprised of at least one of a wireless connector means or a wired connector means.

27. A system as in claim 19, and further comprising a voice synthesizer for presenting the quotation in an audio format.

28. A method for providing a quotation of a security to an occupant of a vehicle, comprising the steps of:

coupling the vehicle to a dispenser of a vehicular energy source, the dispenser being bidirectionally coupled to a data communication network;

initiating a request for a quotation of a security;

transmitting the request from the dispenser to a computer that is also bidirectionally coupled to the data communication network;

fulfilling the request at the computer and transferring the requested quotation to the dispenser over the data communication network;

receiving the requested quotation; and presenting the received quotation in a human perceptible format.

29. A method as in claim 28, wherein the step of presenting includes a step of at least one of displaying or printing the quotation within the vehicle.

30. A method as in claim 28, wherein the step of presenting includes a step of electronically synthesizing a voice for articulating the quotation within the vehicle.

31. A method as in claim 28, wherein the step of presenting the quotation is executed by the dispenser.

32. A method as in claim 28, wherein the step of initiating includes a step of entering an identification of the security, and wherein the transmitted request is comprised of the identification of the security.

33. A method as in claim 28, wherein the step of initiating includes a step of entering an identification of the security, and wherein the transmitted request is comprised of the identification of the security.

34. A method as in claim 28, wherein the step of initiating includes a step of retrieving a stored list comprised of an identification of at least one security, and wherein the transmitted request is comprised of the identification of the at least one security.

35. A method as in claim 28, wherein the step of initiating includes a step of specifying an identity of a stored list comprised of an identification of at least one security, and wherein the transmitted request is comprised of the identification of the at least one security.

36. A method as in claim 28, wherein the step of initiating includes a step of specifying an identity of a file stored in a memory, the file comprising a list comprised of an identification of at least one security.

37. A method as in claim 28, wherein the step of initiating includes a step of specifying an identity of a file stored in a memory, wherein the memory that stores the file is located external to the vehicle, the file comprising a list comprised of an identification of at least one security.

38. A method as in claim 28, wherein the step of initiating includes a step of providing information for enabling the same or another computer that is coupled to the data communication network to retrieve from a memory device a stored list comprised of an identification of at least one security.

39. A method as in claim 28, and further comprising steps of:

transmitting a promotional message to the vehicle;

receiving the promotional message; and presenting the promotional message within the vehicle in a human perceptible format.

40. A method for providing a quotation to an occupant of a vehicle, comprising the steps of:

initiating a request for a quotation with an input user interface of the vehicle;

transmitting the request from the vehicle, via a data communications interface with a dispenser of a vehicular energy source, to a computer that is bidirectionally coupled to a data communication network;

transferring the request from the computer to a source of quotations, the transferred request being routed over the data communication network;

fulfilling the request at the source of quotations and transferring the requested quotation back to the computer, the requested quotation being routed over the data communication network;

transmitting the requested quotation from the computer to the vehicle;

receiving the requested quotation in the vehicle and storing the received requested quotation within a memory of the vehicle; and presenting the stored quotation to an occupant of the vehicle by operating an electronic voice generator.

41. A method as in claim 40, wherein the step of transmitting the request comprises an initial step of bidirectionally coupling the vehicle to the dispenser of a vehicular energy source, the dispenser being bidirectionally coupled to the computer through a data link, and where the request is transmitted from the vehicle to the computer through the dispenser.

* * * * *